July 20, 1971  A. SINGLETON  3,594,128

FOG TOWER FOR TESTING APPARATUS

Filed Aug. 23, 1968

INVENTOR.
ALBERT SINGLETON
BY
Fay, Sharpe & Mulholland
ATTORNEYS.

United States Patent Office 3,594,128
Patented July 20, 1971

3,594,128
FOG TOWER FOR TESTING APPARATUS
Albert Singleton, 7360 Brookside Parkway,
Middleburg Heights, Ohio
Filed Aug. 23, 1968, Ser. No. 754,809
Int. Cl. G01n *17/00*
U.S. Cl. 23—253                                    7 Claims

ABSTRACT OF THE DISCLOSURE

A fog tower for use with corrosion testing apparatus to conduct a flow of corrosive fog. At least one portion of the length of the tower extends transversely to the line of fog flow as the fog enters the tower or transversely to another portion of the tower which is substantially vertical.

BACKGROUND OF THE INVENTION

Figure 1:
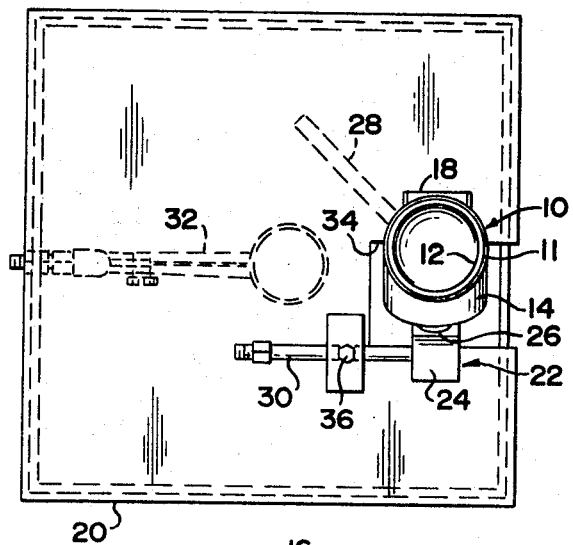
Figure 4:
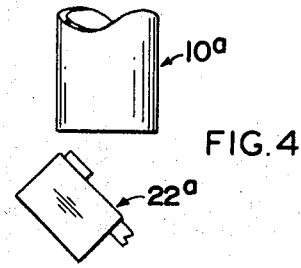
Figure 2:
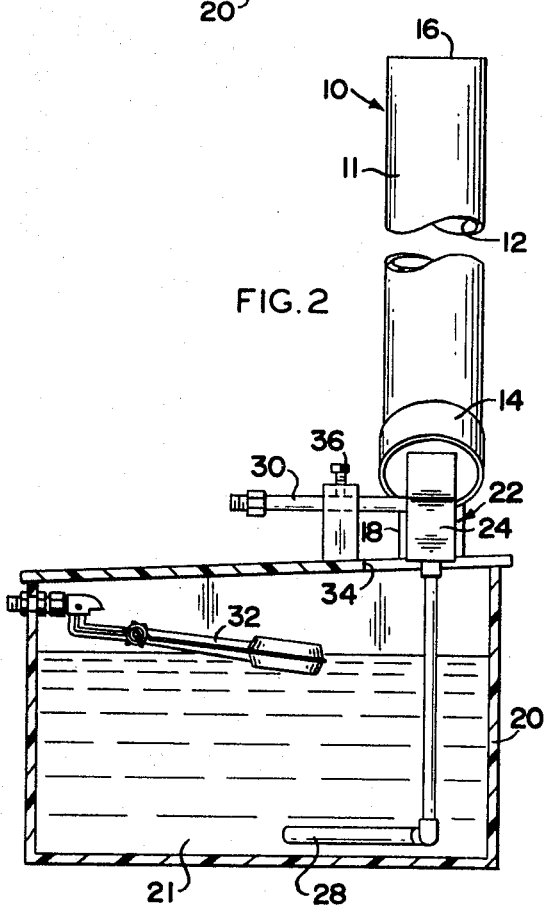
Figure 3:
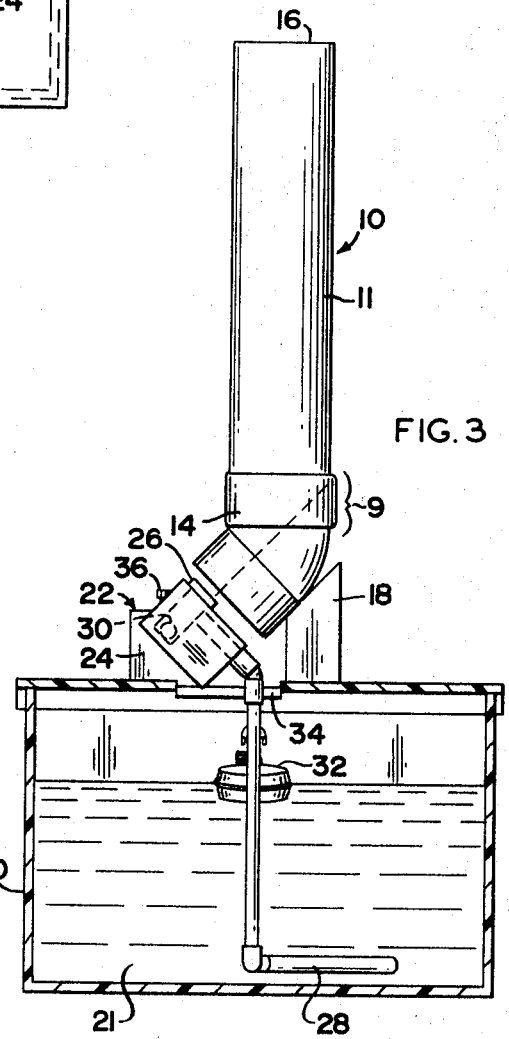

The valuation and testing of the ability of myriad materials, parts and products to withstand corrosive influences such as salt vapor are frequently conducted by accelerated exposure techniques. This method utilizes a test cabinet into which parts to be tested are placed. A corrosive atmosphere, for example, salt vapor fog, is introduced into the cabinet in specified amounts for specific periods of time. Exposed materials are then removed from the cabinet and scrutinized for signs of corrosion, structural breakdown and the like.

To be of value, the cabinet tests must be conducted under rigidly maintained standards and capable of repetition under identical conditions. One of the most important factors in conducting salt vapor cabinet tests is the maintenance of uniform and consistent fog density and avoidance of the emission of unatomized liquid droplets into the test area. This ensures that the same amount of fog vapor will contact the exposed surface area of each material, part or product being tested. It is obvious that such distribution is absolutely essential in obtaining consistent, effective and usable test data. In addition, there are A.S.T.M. standards which govern the amount of fog which must reach each part of the cabinet test area.

Prior art constructions have failed to eliminate inaccurate test results caused by distribution on the test products of droplets of unatomized test liquid formed by condensation on the interior of the tube which pass up the tube and onto the test materials, parts and/or products. These droplets affect the test results since they cause some areas and/or materials to receive more exposure to the corrosive test liquid than others.

The desired fog characteristics are almost entirely dependent upon the fog nozzle which atomizes the corrosive test liquid and the fog tower which conducts and distributes the fog from the nozzle to the enclosed cabinet test area.

The cabinet-fog tower construction employed by the prior art is amply discussed in U.S. Patent No. Re. 25,932 to Neffenger. This patent discloses a continuously vertical, upstanding, open-ended tube or fog tower which conducts fog to the top of a test cabinet for subsequent descent, distribution and accumulation on the materials being tested. A nozzle is located at the base of the tube and emits an atomized corrosion fluid vertically along the axis of the vertical tube. The tube also has a plurality of air induction apertures along its length which are used in an attempt to increase the air supply in the tube and therefore increase dispersion and reduce condensation of the fog. Further, an inverted cone is placed on top of the open outlet end of the tube to divert the fog in all directions as it enters the enclosed test cabinet area and to retain liquid droplets in the tower.

It has been found that the placement of an inverted cone on top of the tower not only tends to deflect the large droplets out of instead of back down the tower, but also can cause large droplets to drip straight down and into the coaxially aligned nozzle. This, of course, causes nonuniform fog distribution and/or nozzle inefficiency, respectively.

SUMMARY OF THE INVENTION

This invention concerns a fog tower for use with corrosion testing apparatus. It has a construction which ensures that flow of corrosive fog is directed against at least a portion of an inner wall of the tower before emission into the test area. This construction has been found to virtually eliminate the major problem heretofore encountered with such testing apparatus, i.e. emission onto test materials or unatomized liquid fog droplets caused by fog condensation or coalescence in the tower.

This invention broadly contemplates a fog tower having a bend or elbow along its length which causes a substantial change in the direction of the line of flow of the corrosive fog between the inlet and outlet portions of the tower. This result may be accomplished by shaping the tower passageway with at least one portion thereof transverse to the line of fog as it enters the tower (or transverse to another portion of the tower which is substantially vertical) or by positioning the nozzle which produces the fog at an angle to the inlet portion of a generally vertical tower.

By utilizing the board concept of this invention, the formation and emission of large droplets of corrosive fog formed by condensation on the inner tower wall or by a nozzle incapable of one hundred percent atomization are substantially decreased and/or eliminated. Generally, condensed fog or fog particles which are not completely atomized collect on the walls of the tower. Since the prior art towers are substantially upstanding or vertically oriented, unatomized fog droplets can be blown upwardly and out of the tower by the continuous force of fog emitted by the nozzle. In this invention, however, the fog leaves the nozzle and then strikes at least one wall of the tower with a subsequent and rapid change of fog flow direction. This diversion or change of direction not only decreases or reduces the upward force exerted on these droplets from fog subsequently emitted by the nozzle (due to velocity reduction of subsequent fog) but also substantially reduces the velocity of the droplets. This velocity reduction causes the droplets to travel downwardly instead of upwardly and out of the tower because of gravity. The combined effect of these factors is sufficient to prevent almost all liquid or unatomized droplets from being emitted from the tower and adversely affecting the test results.

As previously discussed, the fog tower and nozzle are positioned in a cabinet completely enclosing a testing area. A fog tower having outlet and inlet portions and/or apertures is positioned in the testing area. The inner wall of the tower defines a passageway which conducts atomized fog from a nozzle (communicating with the tower inlet portion) toward the outlet portion for emission from the tower and descent and distribution on the parts and/or materials being tested in the carbinet enclosure. In the preferred embodiment, the inlet portion of the tower and the line of flow from the nozzle are in generally coplanar alignment. As it extends away from the inlet, however, a portion of the tower extends transversely to the line of fog flow. Thus, as corrosive fog is introduced into the tower passageway, it strikes or is forced against an inner wall of the tower and caused to rapidly change direction. At this point, on the passageway wall, liquid which has not been completely atomized and therefore is in the form of single droplets which may have a tendency to condense and form larger droplets undergo a velocity reduction and thereafter, because of gravity, travel downwardly and out of the path of lighter and upwardly moving atomized fog.

It is also believed that after the line of fog flow contacts the wall of the tower passageway, it will have a tendency to be deflected at approximately the same angle away from that wall and toward the wall on the opposite side. It can, therefore, be seen that after at least two such deflections, only atomized fog will remain in the fog flow and therefore be emitted into the cabinet chamber.

It has been found that the portions of the tower which extend transversely from the line of initial or entry fog flow should be at an angle of from 15 to just less than 90 degrees to line of fog flow. Angles of less than 15 degrees have been found to change the direction of the line or fog flow only slightly and therefore do not completely eliminate the problem presented. Angles of 90 degrees have been found to so drastically change the fog flow that air currents or turbulence are created in the tower which impede the progress of subsequent fog.

It would, of course, be possible to make more than one portion of the tower extend transversely from the line of fog as it enters the tower. Additional bends of this sort, however, have been found to impede the velocity of the fog to such an extent that condensation is increased rather than decreased and/or kept constant.

Another embodiment of this invention which utilizes the broad concept discussed herein is an axially vertically upstanding fog tower which positions the fog nozzle and therefore the line of fog flow at an angle transverse to the tower axis. Thus, the same contact of the fog with a passageway wall is provided. This construction is not, however, as advantageous as that first disclosed in that it limits the positions to which the nozzle may be adjusted.

Both of the above discussed embodiments also eliminate the problem of condensed droplets collecting on baffles or inverted cones and falling directly into the atomized nozzle. Such occurrences, of course, momentarily eliminate the effectiveness of the nozzle, as well as, spray uniformity and consistency.

DESCRIPTION OF THE DRAWINGS

FIG. 1 is a top plan view of a fog tower embodying the principles of this invention in conjunction with a nozzle and corrosive liquid reservoir;

FIG. 2 is a front elevational view, partially in section, of the device of FIG. 1;

FIG. 3 is a side elevational view, partially in section, further illustrating the device of FIGS. 1 and 2; and FIG. 4 is a side elevational view of an alternative embodiment of the invention.

DESCRIPTION OF THE PREFERRED EMBODIMENTS

FIGS. 1, 2 and 3 illustrate the preferred embodiment of the invention which generally comprises a fog tower 10 having a passageway 12 extending therethorugh and inlet and outlet portions 14 and 16, respectively, at opposite ends of the tower. Tower 10 may be held in position by any convenient means. A pedestal such as 18 mounted on top of the corrosive liquid reservoir 20 may be used.

The reservoir 20 contains the corrosive liquid 21 which is to be atomized by the nozzle 22 and introduced into the tower 10 as a fog. It may be constructed of any material not subject to attack by the corrosive fluid. It should be understood that reservoir 20, tower 10 and nozzle 22 are, in practice, located in a closed cabinet, not shown.

The atomizing nozzle 22 has a housing 24 and a jet 26 for emitting corrosive fog into the inlet portion 14 of tower 10. In communication with the nozzle housing 24 are conduit means 28 and 30. Conduit means 28 draw corrosive fluid from the reservoir 20 for mixing with pressurized, water-saturated air entering housing 24 from conduit means 30. Conduit means 30 is in communication with a bubble tower (not shown) which saturates and places under pressure the air entering the conduit 30 and housing 24.

The liquid level in the reservoir 20 may be kept constant to assure uniform fog consistency by means of a conventional float valve 32.

It will be seen (FIGS. 1, 2 and 3) that between the inlet 14 and outlet 16 portions of lower 10 at least a portion of the length of the tower extends transversely (as at 9 to the line of fog flow (shown in dotted lines in FIG. 3) or transversely to the axis of a vertically extending portion of the tower such as at 11 in FIG. 1.

Three factors using the construction of this invention, contribute to eliminate or greatly reduce the possibility of droplets of unatomized fluid from being emitted from the outlet portion 16 of the tower 10. These factors are: (1) the fog emitted from the jet 26 of the nozzle 22 is under a reasonably high velocity. However, as it enters the inlet portion 14 of tower 10, which has an internal diameter larger than that of the jet 26, the fog velocity is reduced. This causes a low velocity updraft through the tower 10. Thus updraft carries only atomized fog which has not coalesced or condensed on the inner walls of the inlet portion of the otwer; (2) the velocity of any liquid droplets emitted from the nozzle is decreased as the droplets strike the transversely extending wall of the tower; and (3) the decrease of velocity of the fog as discussed in (1) above decreases the force pushing the liquid droplets up the tower and therefore increases their chance of traveling downwardly in the tower and not upwardly for emission into the testing area.

It should be here noted that by positioning the liquid reservoir directly beneath the tower and inlet portion thereof, it is possible to place an aperture in the top of the reservoir such as at 34. This construction enables liquid droplets which have condensed or coalesced on the tower and have traveled downwardly to return to the reservoir for re-ues. Because of this travel of droplets down one side of the tower, it is advantageous to position the nozzle jet 26 away from this area, as best seen in FIG. 3, to prevent high velocity fog leaving the jet from pushing the droplets up the tower rather than letting them run downward and into the reservoir.

It has been found that the transverse portion of tower 10 should preferably form an angle of between 15 to just less than 90 degrees with the line of fog flow. Angles of less than 15 degrees have been found to change the direction of flow only slightly and therefore do not effectively reduce droplet velocity to the extent necessary in order to avoid further upward travel of the droplets. Angles of 90 degrees have been found to so drastically change the fog flow that currents and turbulence are created in the tower which impede the progress of subsequent fog.

FIG. 4 shows an alternative embodiment utilizing the same principles of the invention, but wherein a continuously vertical, upstanding tower **10*a* is used. Here the nozzle 22*a* is tilted in the manner shown to place the line of fog flow at an angle transverse to a wall of the tower. Although, this construction will work equally well under most conditions as that shown in FIGS. 1, 2 and 3 it is considered less desirable because of the limited angular adjustment available to the nozzle. As seen in FIGS. 1, 2 and 3 a set screw 36 may be provided on conduit means 30** whereby the nozzle may be adjusted so that it may strike different areas of the tower. A loss in flexibility of nozzle adjustment therefore occurs with the embodiment of FIG. 4.

For ease of description, the invention has been disclosed as being incorporated in but two embodiments. It is obvious, however, that various modifications may be made to the illustrated form without departing from

I claim:

1. A corrosion testing apparatus having a fog tower and an atomizing nozzle adapted to produce a flow of corrosive fog;
    said tower having an inner wall defining a fog conducting passageway having an axis extending between an inlet and an outlet;
    said atomizing nozzle being in communication with said inlet of said tower;
    said nozzle being positioned to direct said corrosive fog along a line at an angle in the range 15 to just less than 90 degrees with respect to at least a portion of said inner wall whereby said nozzle directs said flow of fog against at least a portion of said inner wall of said tower passageway, said nozzle being transversely spaced from a line coextensive with at least the majority of the length of said passage axis.

2. The improvement of claim 1 in which said inner wall of said tower is continuous about a linear axis between said inlet and said outlet.

3. The improvement of claim 1 wherein the passageway includes no more than one angular bend from its inlet to its outlet.

4. The improvement of claim 1 wherein the tower comprises two sections having substantially linear axes, said sections being joined to form said passageway having an included angle substantially in the range greater than 90 degrees and less than 165 degrees, one of said sections including the inlet and the other including the outlet.

5. The improvement of claim 4 wherein the nozzle emits said fog through said inlet substantially parallel with the axis of said section which includes the inlet.

6. The improvement of claim 1 including a reservoir below said tower, said reservoir including an aperture in its upper surface for receiving droplets of liquid falling from the inlet of said tower.

7. The improvement of claim 6 wherein the reservoir aperture is located directly below the tower inlet for allowing a drop of fluid to fall vertically from the inlet through the aperture.

References Cited

UNITED STATES PATENTS

| | | | |
|---|---|---|---|
| 640,796 | 1/1900 | Neuhs | 55—257X |
| 3,077,714 | 2/1963 | McIlvaine | 55—257X |
| 3,141,750 | 7/1964 | Hungate | 55—257X |
| 3,163,497 | 12/1964 | Gill | 23—230C |
| 3,259,466 | 7/1966 | Jacks, Jr. | 23—230C |
| 3,348,466 | 10/1967 | Lane et al. | 55—257X |

OTHER REFERENCES

ASTM Designation B–117–64, vol. 21 (January 1965 of ASTM standards), pp. 1–9.

Champion, F. A.: Corrosion Testing Procedures, 2nd ed., pp. 85, 88, 89 and Fig 21 (1965).

Hess, W.: Corrosion Prevention and Control, vol. 5, pp. 47–51 (April 1958).

MORRIS O. WOLK, Primary Examiner

E. A. KATZ, Assistant Examiner

U.S. Cl. X.R.

55—238, 257; 261—78, 116, 126